United States Patent

Roy et al.

[11] Patent Number: 5,838,909
[45] Date of Patent: Nov. 17, 1998

[54] REDUCING LATENCY WHEN SYNCHRONIZING ACCESS TO A MULTI-USER DATABASE OVER A NETWORK

[75] Inventors: H. Scott Roy, San Francisco; William D. Harvey, Palo Alto, both of Calif.

[73] Assignee: Sandcastle, Inc., San Jose, Calif.

[21] Appl. No.: 652,803

[22] Filed: May 23, 1996

[51] Int. Cl.⁶ .................................................. G06F 15/80
[52] U.S. Cl. ...................................... 395/200.39; 463/42
[58] Field of Search ..................................... 395/601, 617, 395/200.03, 200.05, 200.19, 200.08, 200.38, 200.39, 200.31, 200.32, 200.78, 200.43; 463/40, 41, 42, 43

[56] References Cited

U.S. PATENT DOCUMENTS

| | | | |
|---|---|---|---|
| 4,473,889 | 9/1984 | Ross | 395/200.78 |
| 4,570,930 | 2/1986 | Matheson | 395/200.56 |
| 5,261,094 | 11/1993 | Everson et al. | 707/201 |
| 5,329,619 | 7/1994 | Pagé et al. | 395/200.33 |
| 5,423,037 | 6/1995 | Hvasshovd | 707/202 |
| 5,434,994 | 7/1995 | Shaheen et al. | 707/201 |
| 5,461,608 | 10/1995 | Yoshiyama | 395/200.39 |
| 5,538,255 | 7/1996 | Barker | 463/41 |
| 5,547,202 | 8/1996 | Tsumura | 463/41 |
| 5,561,769 | 10/1996 | Kumar et al. | 395/200.32 |
| 5,586,257 | 12/1996 | Perlman | 348/1 |
| 5,586,937 | 12/1996 | Menashe | 463/41 |
| 5,630,757 | 5/1997 | Gagin et al. | 463/43 |
| 5,668,950 | 9/1997 | Kikuchi et al. | 463/42 |
| 5,685,775 | 11/1997 | Bakoglu et al. | 463/41 |

OTHER PUBLICATIONS

Bestavos, Azer et al., Application—Level Document Caching in the Internet, pp. 166–172, IEEE 1995.

PCT Search Report for International Appl. No. PCT/US97/09054, Dated Nov. 24, 1997.

*Primary Examiner*—Parshotam S. Lall
*Assistant Examiner*—Patrice L. Winder
*Attorney, Agent, or Firm*—Fish & Richardson P.C.

[57] ABSTRACT

A method and apparatus for reducing network latency during execution of a multiple-player game across a computer network are provided. A master database represents a world model for the game, and a master event server sequences user inputs, or events, for updating the master database. The master event server and the master database are initially located on a particular node in the network. Every other node that is used by a player in the game has a slave event server and a slave database. Slave event servers are responsible for updating their local slave database, sending events from their local node to the master event server, and forwarding events to and from other slave servers. In the method, a determination is made of which player in the game has a role in the game requiring the least latency of any role and which node in the network is being used by that player. The master event server and the master database are then migrated to that node by changing the status of the slave server of that node to that of master event server. Once the master event server has been migrated, other slave servers can establish a direct connection with the new master event server.

59 Claims, 15 Drawing Sheets

… (5,838,909)

REDUCING LATENCY WHEN SYNCHRONIZING ACCESS TO A MULTI-USER DATABASE OVER A NETWORK

FIELD OF THE INVENTION

The present invention pertains to the field of computer networking. More particularly, the present invention relates to reducing latency when synchronizing access to a multi-user database over a network.

BACKGROUND OF THE INVENTION

Use of the Internet has been increasing rapidly in the past several years. One potential use of the Internet which has particular appeal for many users is the possibility of using the Internet to play computer games. Existing technology allows two players at different locations to simultaneously play a game using a direct telephone or ISDN connection. Similarly, computer games can be implemented on a local area network (LAN) in which each player in the game uses a different computer. However, there are unique problems associated with implementing a multi-player computer game across a wide area network (WAN), particularly one as expansive as the Internet.

One such problem is that even computer games which are designed for multiple players using different computers tend to be sensitive to latency in communicating data between computers. Consider, for example, a computer game in which two or more players at remote locations interact with each other within a fictitious "game world." The game world can be modeled by a database, which might be located on one of the player's computers or on a central server. The players interact with each other by entering inputs through a joystick, mouse, keyboard, or other input/output device. In order for the game to be enjoyable, the game world must accurately reflect the current history of user inputs, or "events," received from all players. To resolve ambiguity of event ordering, events are typically collected at a central server that establishes the event sequence. However, differences in delays between the various computers involved in the game can hinder the proper sequencing of events when updating the game world. In addition, the speed with which events are communicated to and from the game world (i.e., the database) can be critical, depending upon the type of game being played. For example, in naturally fast-paced games, such as those involving close combat between characters and many simulations, high latency can cause the game to be unrealistic, if not completely unplayable. High latency can be quite problematic even in games in which only particular players have latency-sensitive roles.

Sensitivity to latency presents a significant obstacle to implementing certain multi-player computer games on the Internet, because the latencies associated with the Internet can be substantial and quite unpredictable. Various factors contribute to this unpredictability, including diverse delays between different communication paths (which may be caused by differences in communications hardware), uncertainty as to which physical route a given transmission will take, and wide variations in network communications traffic over time. Therefore, what is needed is a technique for overcoming such difficulties associated with the prior art when implementing multi-player computer games on a WAN. In particular, what is needed is a technique for resolving latency concerns in a multi-player game implemented on the Internet.

SUMMARY OF THE INVENTION

A method is provided of reducing network latency in accessing a database in a network. The network has a number of nodes, including a first node and a second node. The first node includes a first event server for sequencing commands to the database, which is stored in one of the nodes in the network. The second node includes a second event server for sequencing commands to the database. The method comprises the steps of changing the status of the first event server from master event server to slave event server based on a network latency criterion, and assigning the status of master event server to the second event server based on the network latency criterion.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for reducing latency when synchronizing access to a multi-user database over a network is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes methods having various steps. These steps may be embodied in computer program instructions. The instructions can be used to cause a general purpose processor which is programmed with the instructions to perform the steps. Alternatively, the steps of the present invention may be performed by specific hardware components that contain hardwired logic for performing the required steps, or by any combination of programmed general purpose computer components and custom hardware components.

The present invention is particularly suited to reducing latency when implementing a multi-player game on the Internet. In particular, the present invention is suited to implementing a game in which a fictitious game world is modeled by a database, and in which one particular player of the game has a role with a latency requirement that is significantly more restrictive than the other players' roles. An example of such a game is a simulated (American) football game in which one player plays offense and a second player plays defense at any given point in time. In such a game, the player on offense might be responsible for movement of the players, including the speed and direction of various players, while the player on defense might be responsible only for selecting a predefined defensive pattern. Hence, in such a game, the player on offense would have substantial interaction with the game world, whereas the player on defense would have little or no interaction with the game world. Accordingly, the role of the player on offense would have a substantially more restrictive latency requirement than the role of the defensive player. Another example of a game in which one player has substantially more restrictive latency requirement than the other players is a role-playing fantasy game. In such a game, one player acting as a "superhero" may participate on a very active level, while various parameters of the game might be determined at a high level by one or a small number of players who participate only in a peripheral manner (e.g., by setting game conditions, selecting obstacles for the superhero to overcome, etc.). Hence, the player having the superhero role would have a much more restrictive latency requirement than the other players, because he interacts with the database on a much more active level.

Figure 1:
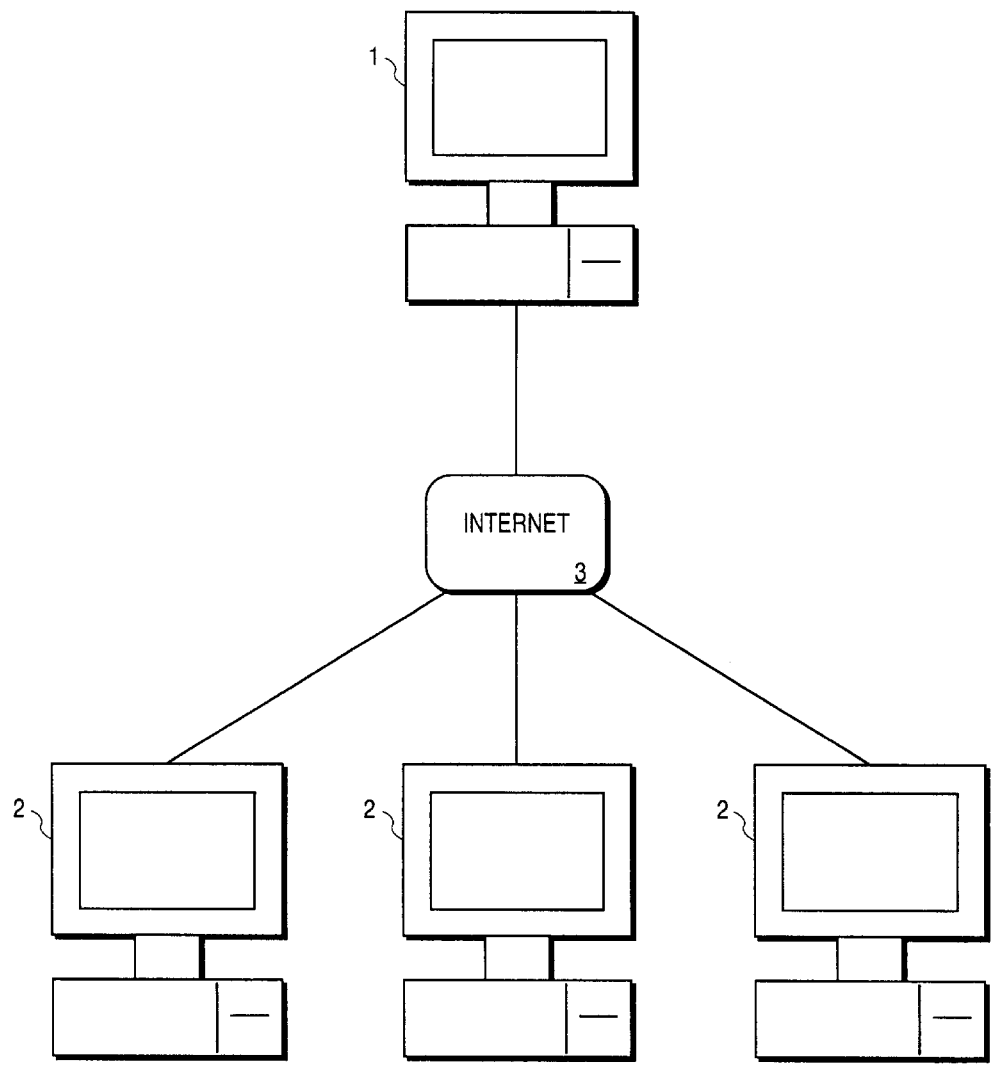
FIG. 1 illustrates a plurality of computer systems connected in a network configuration.

Referring now to FIG. 1, a network configuration in which the present invention may be implemented is illustrated. A central server computer 1 is coupled via the Internet 3 to a number of client computer systems 2. The server computer system 1 and each of the client computer systems 2 includes stored game software, including software in which the present invention is embodied. The game software includes various application program interfaces (APIs) providing an interface to operating system software.

Figure 2:
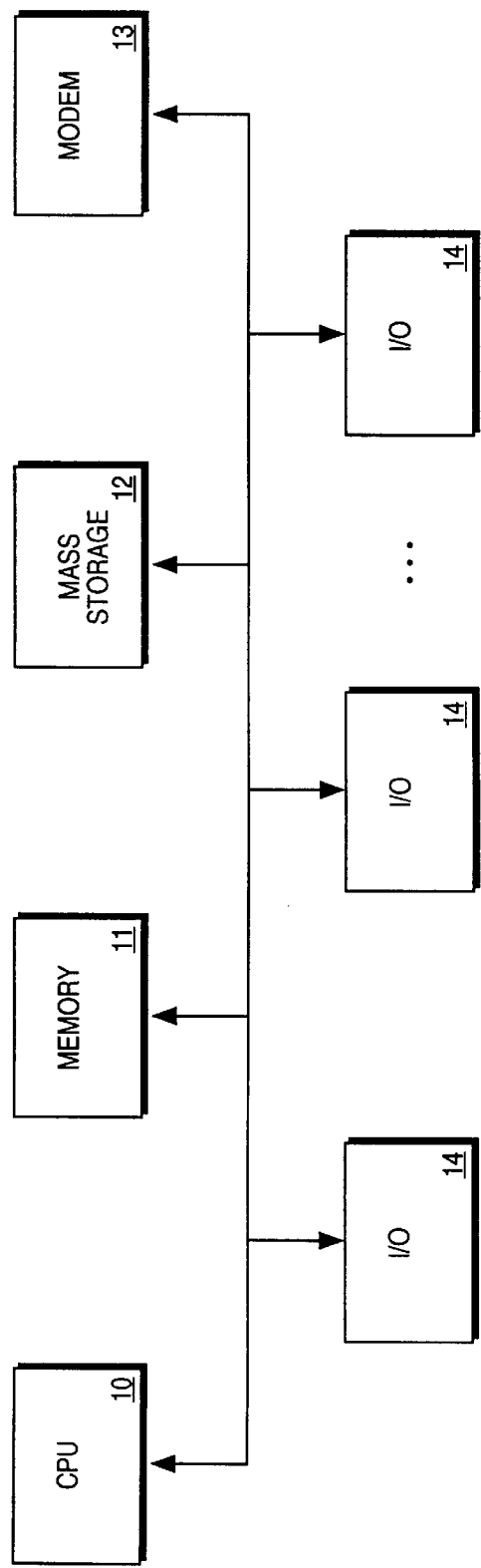
FIG. 2 is a block diagram of a computer system in which the present invention can be implemented.

FIG. 2 illustrates an example of an architecture which may be used for any of the client computer systems 2 or the server computer system 1. The architecture includes a central processing unit (CPU) 10, memory 11, a mass storage device 12, a modem 13, and various input/output (I/O) devices 14. Memory 11 represents both random access memory (RAM) and read-only memory (ROM). Mass storage device 12 includes an optical, magnetic, or other similar storage medium suitable for use with a personal computer system. I/O devices 14 may include any combination of devices such as a mouse, a joystick, a trackball, a keyboard, a monitor, or other I/O devices. The software in which the present invention is embodied may be stored in mass storage device 12, memory 11, or both. In addition, the software may be distributed between two or more of the computer systems illustrated in FIG. 1.

Figure 4A:
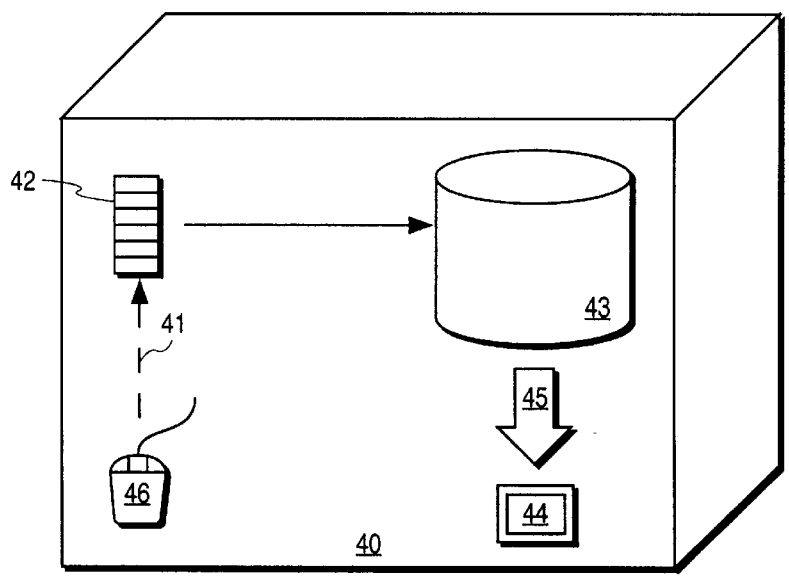
FIG. 4A illustrates a single-player game based on a database running on a computer system.

FIG. 4A shows a representation of a computer system 40 running game software according to one prior art embodiment. A database 43 provides a world model for the game (i.e., a "game world"). User inputs 41 are received through a game-compatible I/O device 46 (such as a mouse or joystick) and provided to software 42. Software 42 receives and sequences user inputs, or "events," that are used to update the database 43. Rendering commands 45 are sent from the database to a display 44 of the computer system 40 to generate various scenes representing the game world. Techniques for implementing a game as illustrated in FIG. 4A are well-known.

Figure 4B:
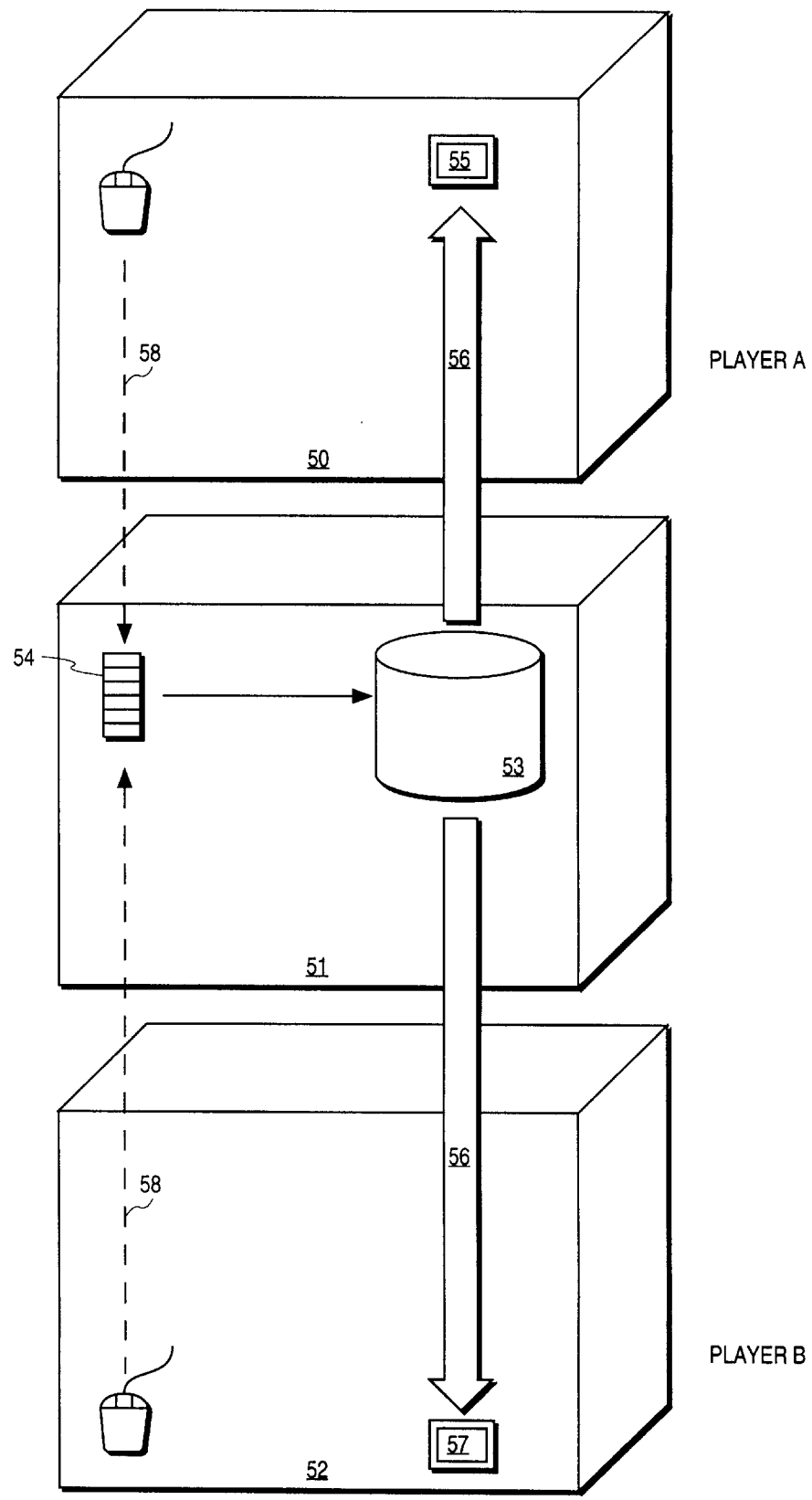
FIG. 4B illustrates a multi-player game running in a network using a client-server configuration.

FIG. 4B shows a well-known configuration for implementing a multi-user game on a network. In the configuration of FIG. 4B, the game world is provided by a database 53 located on a central server 51. Client computer systems 50 and 52 are used by Players A and B of the game, respectively. Software 54 located in the central server 51 receives events 58 from computers 50 and 52 and provides these events to the database 53 in order to update the game world. Rendering commands 56 are then sent from the updated database 53 in the central server 51 across the network to update the displays 55 and 57 of client computers 50 and 52, respectively.

As mentioned above, implementing as shown in FIG. 4B on the Internet can be problematic if either of Players A and B are subject to a significant latency restriction. In addition, the transmission of rendering commands 56 from server 51 to clients 50 and 52 can be hindered by bandwidth limitations of the network. Consequently, the present invention provides a technique for overcoming such difficulties.

In the technique of the present invention, every machine that participates in the game runs software referred to herein as an "event server." One of the event servers is known as the "master event server" and is responsible for sequencing all changes to a master database representing the game world. All event servers other than the master event server are considered to be "slave event servers".

In the preferred embodiment, the master database is located on the same machine as the master event server. Slave copies of the master database (or portions thereof) are stored on each machine other than the machine in which the master event server is located. By providing one master copy of the database, events originating from different machines can be more easily synchronized. By providing slave copies of the database in every other machine involved in the game, the need to send rendering commands across the network is reduced or eliminated, which reduces bandwidth consumption.

In one embodiment of the present invention, the master database is divided into multiple sections, or "objects", each of which may reside on a different machine. Each section functions as a master database relating to a particular aspect or subset of the game, and a separate master event server is associated with each section.

An event server generally performs the following primary functions:

(1) connecting to other event servers;
(2) routing events to the local database and to other event servers;
(3) migrating the master event server; and (4) reconnecting to a new event server such that events are not lost or duplicated.

Each event server maintains a list of open connections to other event servers, one of which is always tagged as the route to the master (RTM) event server.

As will be described in greater detail below, the master event server is migrated to a machine used by the player having the role with the most restrictive latency requirement. In the embodiment described above in which there are multiple master event servers corresponding to multiple sections of the master database, each master event server can be independently migrated to another machine, as appropriate. Further, all machines participating in the game which do not have the master event server are then able to reconnect to the machine which has the master event server or to any other machine in order to improve network latency.

Figure 5A:
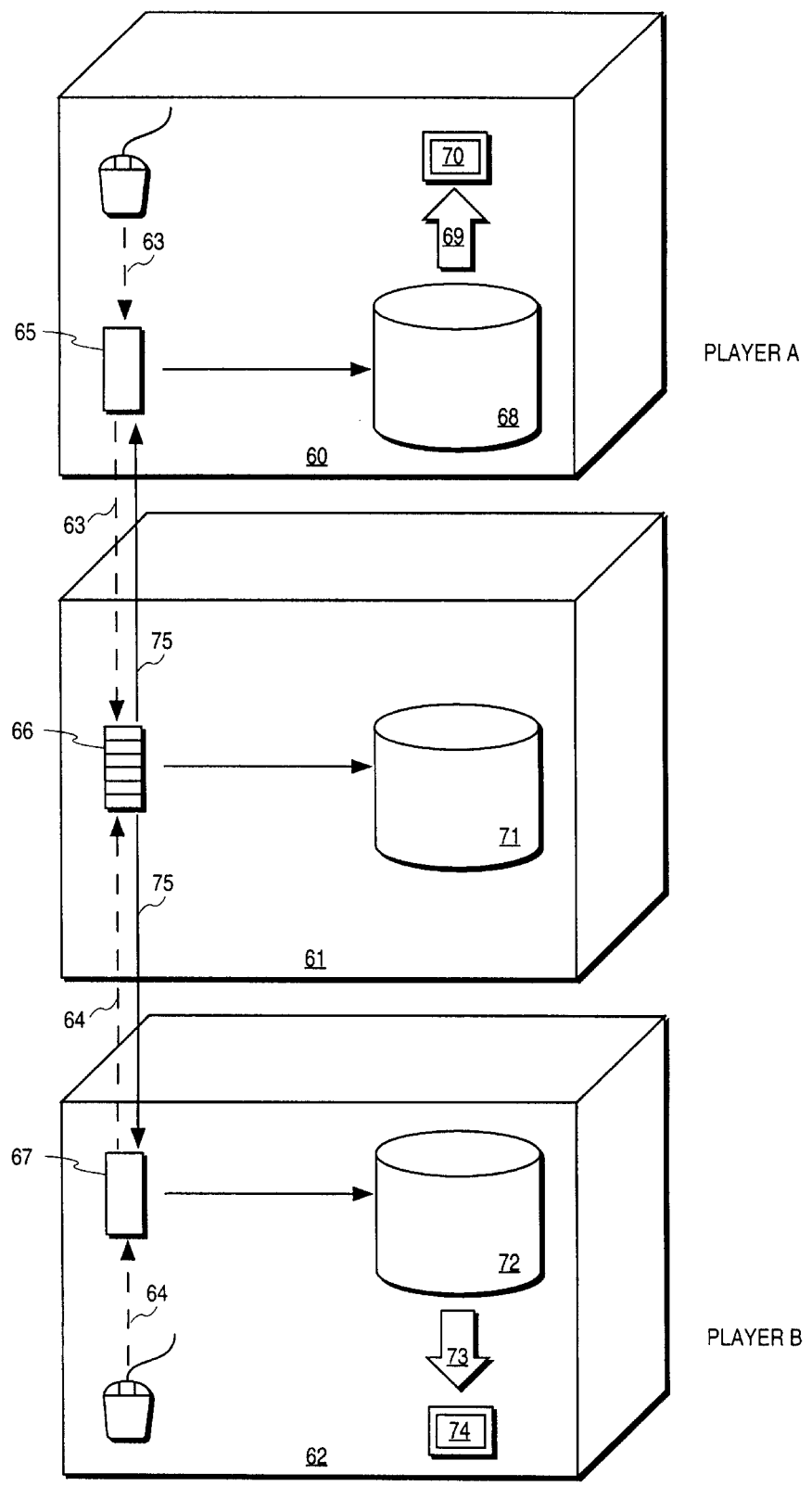
FIG. 5A illustrates a multi-player game running in a network in accordance with the present invention, in which the master event server has not yet been migrated.

FIG. 5A illustrates a technique according to the present invention for implementing a multi-user game over the Internet. In FIG. 5A, the game is played by two players, players A and B, operating computer systems 60 and 62, respectively. It is noted, however, that the present invention is equally applicable to a game played simultaneously by more than two players. Initially, the master database 71 and the master event server 66 are located in a central server computer system 61. Located in computer system 60 (used by player A) are a slave event queue 65 and a slave copy 68 of master database 71. Similarly, located in computer system 62 (used by player B) is a slave event server 67 and a slave copy 72 of master database 71. The display 74 of computer system 62 is updated by rendering commands 73 from the slave copy 72 of master database 71, rather than from the master database 71 itself, thereby reducing bandwidth consumption on the network. Similarly, the display 70 associated with computer system 60 is updated by rendering commands 69 from slave copy 68 of master database 71, rather than directly from master database 71.

Events 64 from computer system 62 are received by slave event server 67 and then passed along to the master event server 66, unless the events 64 are purely local events for updating only the slave copy 72 of the database. Purely local events might be, for example, events which set display options or other functions that are only relevant to computer system 62. Similarly, events 63 originating from computer system 60 are received first by slave event server 65 and then passed along to master event server 66, unless those events are purely local to computer system 60. Events received by the master event server 66 are used to update the master database 71 and are passed along to all slave event servers as master events 75.

Figure 7:
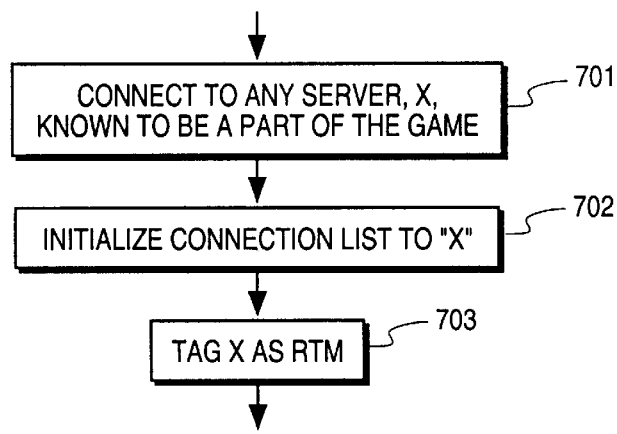
FIG. 7 is a flow diagram illustrating a technique for establishing a connection to a computer system having multi-player game software.

Referring now to FIG. 7, a routine is illustrated by which by an event server which is not yet involved in the game connects to another event server that is already part of the game. An event server which is not yet part of the game is, by definition, a slave event server. Referring to FIG. 7, the slave event server first connects to any other event server, X, which is known to be a part of the game (step 701). The knowledge of which event servers are already part of the game, and their logical addresses, can be provided to the connecting event server in any of a number of possible ways. The methods for providing such knowledge are not germane to the present invention. Next, the slave event server which is joining the game initializes its connection list to include X (step 702). X is then tagged as the RTM (route to master) in the connection list (step 703).

Figure 5B:
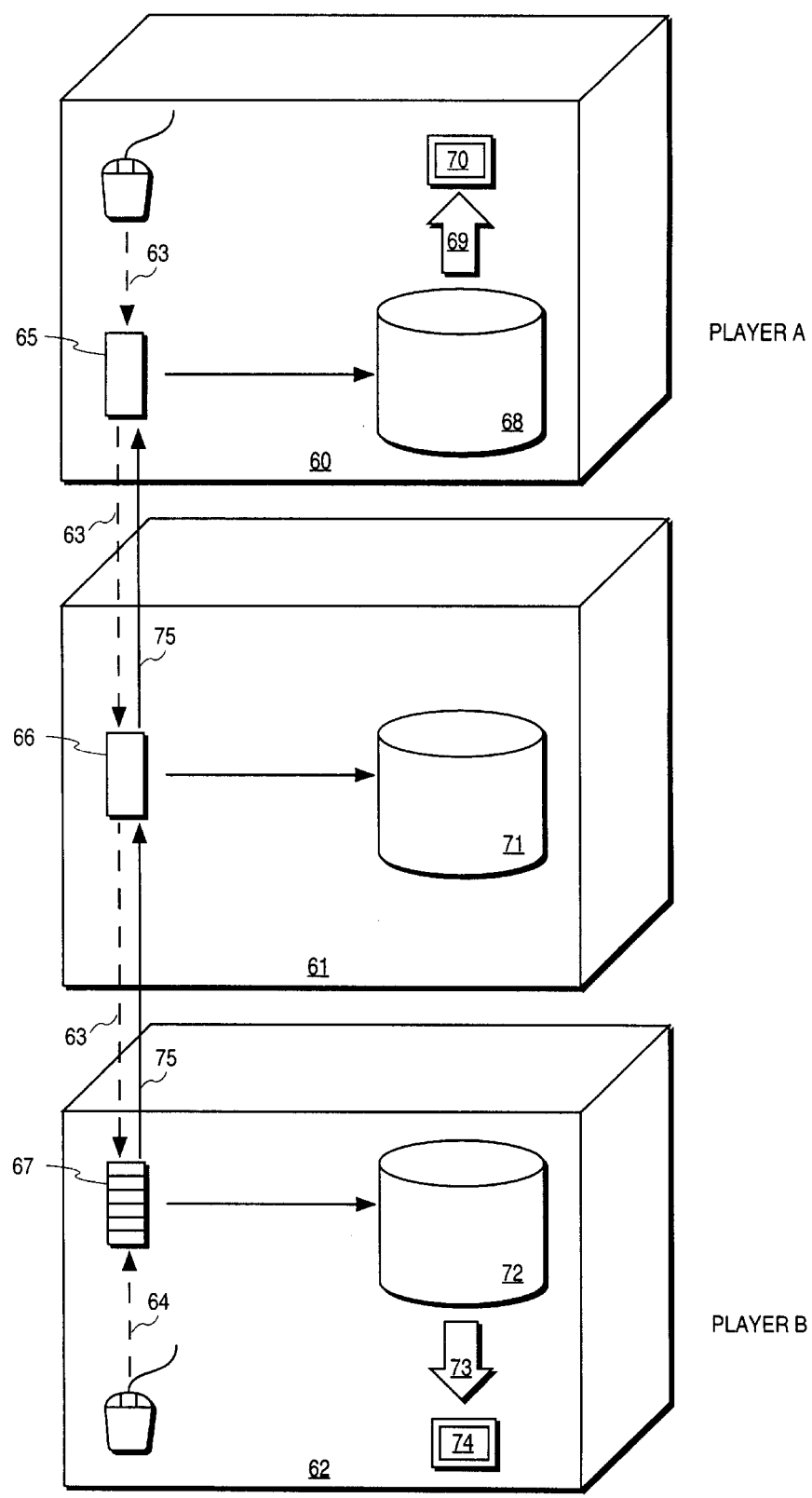
FIG. 5B illustrates a multi-player game running in a network in which the master event server has been migrated.

According to the present invention, a determination is made of which computer system participating in the game is used by the player having the role which requires the least latency. Once this is determined, the master event server 66 is migrated to the machine used by that player. Referring now to FIG. 5B, assume that it has been determined that player B (using computer system 62) has the role in the game which requires the least latency. Consequently, master event server 66 is migrated to computer system 62. More specifically, the status of event server 66 is changed from master event server to slave event server, and the status of event server 67 is changed from slave event server to master event server. Similarly, the master database 71 is migrated to computer system 62. The status of slave event server 65 associated with Player A remains slave event server. Events 75 output by (newly designated) master event server 67 are then considered to be master events, rather than slave events.

Figure 3:
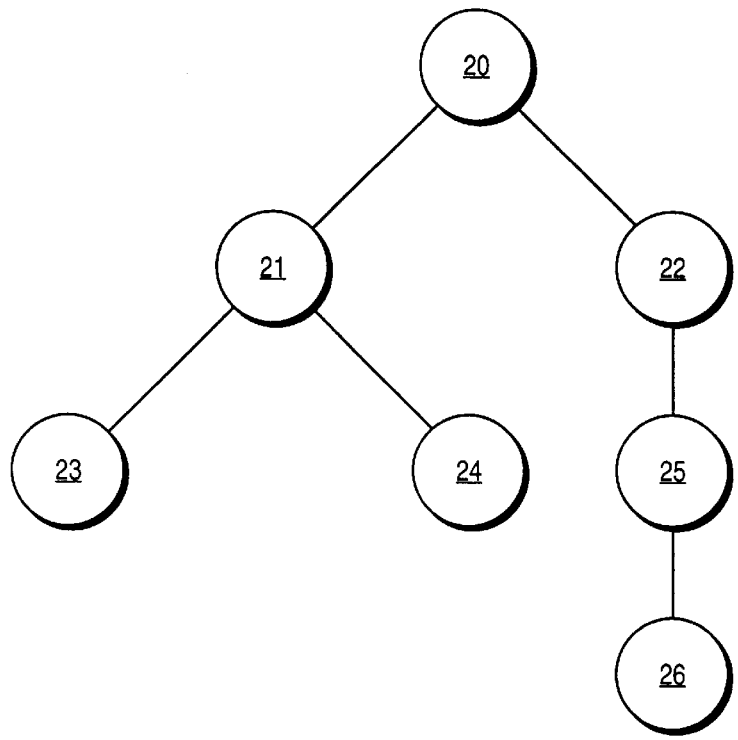
FIG. 3 illustrates a logical configuration in which a plurality of computer systems can be connected according to the present invention.

As mentioned above, the present invention is equally applicable in a situation in which many players using many computers are involved in the game using the Internet as a communication medium. The logical configuration of computers involved in the game in that case would likely have the form of a tree hierarchy, as illustrated in FIG. 3. FIG. 3 illustrates the logical configuration of several computer systems 20 through 26. Computer system 20 initially contains the master event server and the master database and is therefore shown as the root node of the tree hierarchy.

In a game situation involving two or more players, a given computer may not be directly connected to the computer having the master event server; such is the case for computers 23 through 26 in FIG. 3. Consequently, certain computers, such as computers 21, 22 and 25, will be required to forward events received from other computers. The present invention provides a technique for handling such forwarding, which is discussed below in connection with FIGS. 8A and 8B.

The present invention includes steps by which the slave event server sends slave events to the master event server over the network, and by which the master event server sends (multi-casts) master events over the network to every slave event server in the game. The master event server has the responsibility of ensuring that slave events originating from any given machine are processed in the order in which they were sent. This is a concern, since it is possible for two slave events to arrive out of order when the master event server migrates or when a slave event server reconnects to a different event server (e.g., after migration of the master event server).

Figure 8A:
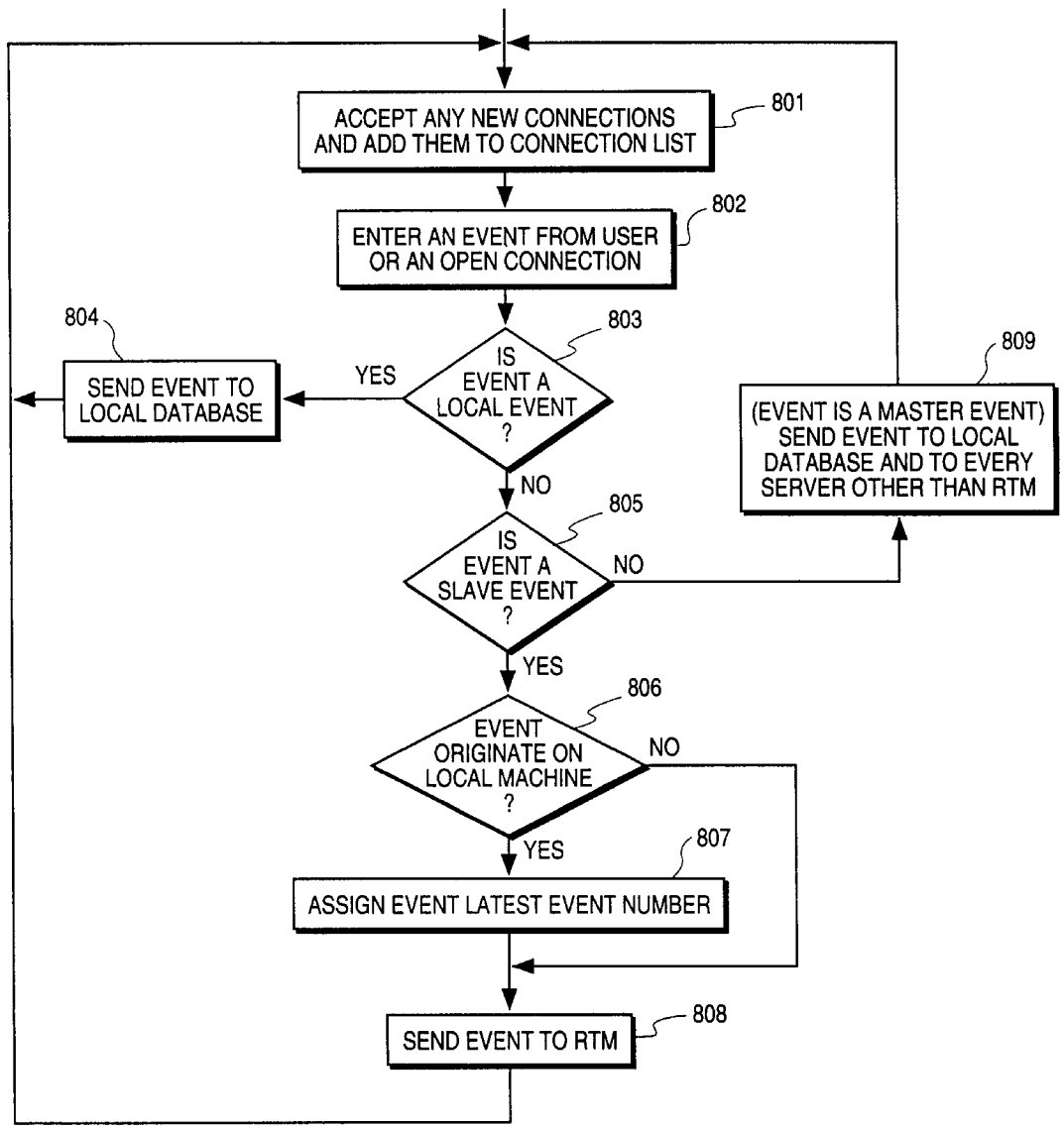
FIG. 8A is a flow diagram illustrating a technique used by a slave event server for routing events in a network.

FIG. 8A illustrates a routine used by a slave event server for opening connections to other event servers and for routing events. Initially, the slave event server accepts any new connections and adds them to its connection list (step 801). Next, the slave event server inputs an event received either from a user or from one of its open connections (step 802). If (in step 803) the event is a local event (i.e., if the event is intended only for use on the local machine), then the slave event server sends the event only to its local database (step 804) and the routine repeats from the beginning. If the event is not a local event and the event is a slave event (step 805) which originated on the local machine (step 806), then the event is assigned the latest event number for the local machine (step 807) and is routed to the RTM (step 808). If, however, the event is a slave event, but the event did not originate on the local machine, then the event is not assigned an event number by the local slave event server, but is simply routed to the RTM (step 808). If the event is neither a local event nor a slave event, then the event is a master event, in which case the event is routed to the local database and to every server connection other than the RTM (step 809).

Figure 8B:
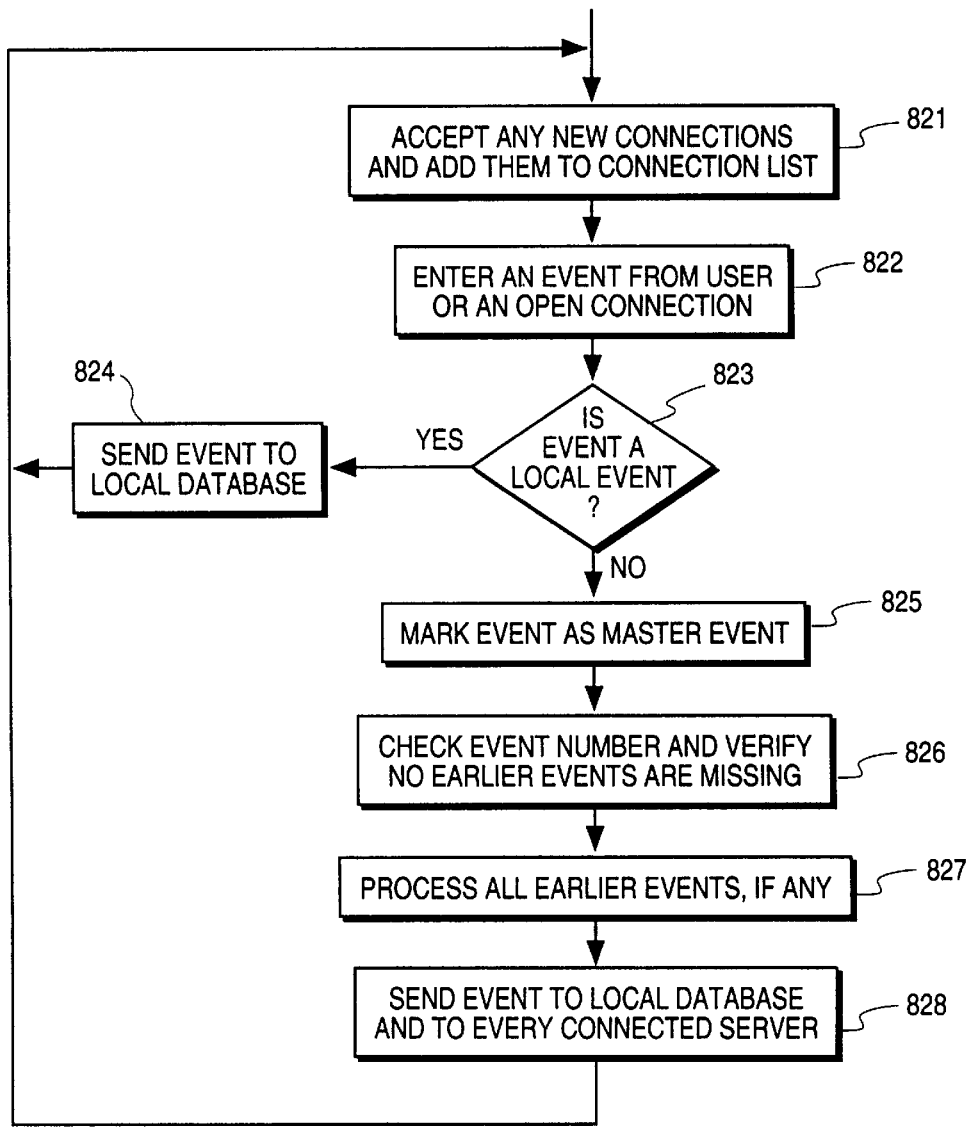
FIG. 8B is a flow diagram illustrating a technique used by the master event server for routing events in a network.

FIG. 8B illustrates a routine used by a master event server for opening connections and routing events to slave event servers. Initially, the master event server accepts any new connections and adds the connections to its connection list (step 821). Next, an event is input to the master event server, either from a user or from an open connection (step 822). If the event is determined to be a local event (step 823), then the event is sent only to the master database. However, if the event is not a local event, then the event is considered to be, and is marked as, a master event (step 825). Hence, when a slave event is received and processed by the master event server, it effectively becomes a master event once it is retransmitted (multi-cast) by the master event server. Once the event is marked as a master event, the master event server checks the event number associated with that event to verify that no earlier events from the sending event server are missing (step 826). It is possible for events to be missing in situations in which a sending slave event server has recently reconnected to a newly assigned master event server. In that situation, two events sent by the slave event server may take different routes to their destination and may therefore arrive out of sequence. Consequently, once all earlier events have been processed (step 827), the event is sent to the local database and to every event server listed in the connection list of the master event server (step 828).

As described above, a key feature of the present invention is that the master event server and the master database are migrated to another machine in order to minimize latency. The authority to initiate migration can be placed with either the master event server or a slave event server. If the authority to migrate is placed with a slave event server, then a slave event server determines whether it has a latency requirement that is sufficiently stringent to justify migrating the master event server to that machine. A slave server can make this determination by knowing the topology of the game and the latencies of the participating devices. Accordingly, in such an embodiment, the master event server can broadcast information describing the current network configuration and latencies associated with each device in the game to each connected slave event server at regular intervals, or whenever a new slave event server connects to the game.

Regardless of which device has the actual authority to approve of migration of the master event server, the migration process can be initiated by a request or command transmitted over the network by a slave event server. The request or command is a special event known as a "slave migration event." The master event server initiates the migration process by sending a "master migration event". When a slave event server receives a slave migration event from another slave event server, it adds its identifier to the end of the event message. Hence, the slave migration event gets annotated with the complete path it follows to reach the master event server. The master migration event sent in reply also contains the same path information. Accordingly, interceding slave event servers can correctly route the master migration event to the slave event server that transmitted the slave migration event and update their respective RTM information.

Figure 9A:
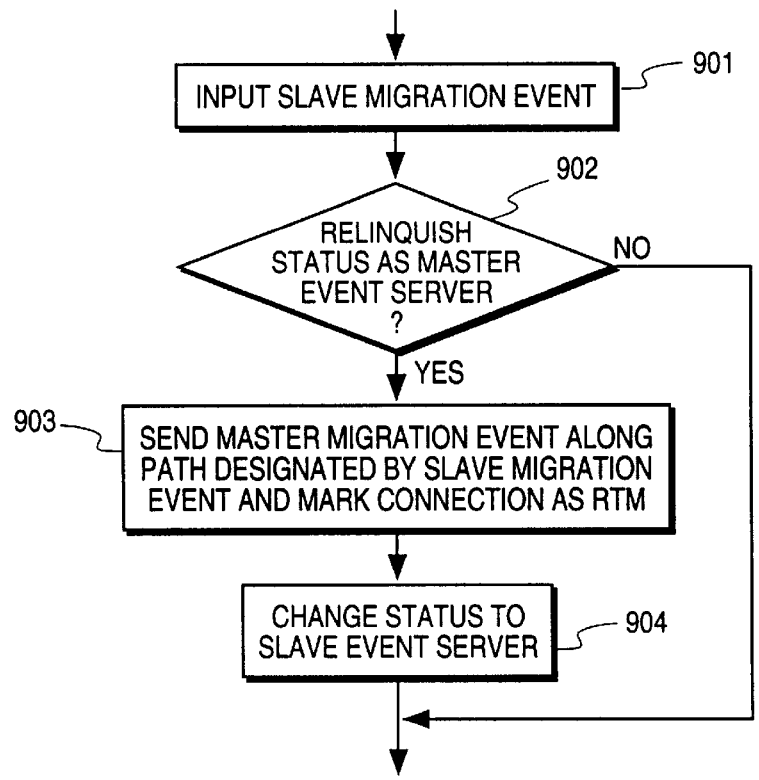
FIG. 9A is a flow diagram illustrating a technique used by the master event server for handling a slave migration event.

FIG. 9A illustrates the migration routine performed by the master event server according to one embodiment. Initially, the master event server inputs a slave migration event (step 901). The master event server then determines whether to relinquish its status as the master event server (step 902). (As already mentioned, this decision might be made by a slave event server in another embodiment.) If it is appropriate to relinquish its status as the master event server, then the master event server sends a master migration event along the path which was designated by the received slave migration event, and marks that connection as the RTM (step 903). Next, the master event server changes its status to slave event server (step 904). If the master event server determines that it is not appropriate to change its status as master event server (step 902), then the slave migration event is ignored and the routine ends.

Figure 9B:
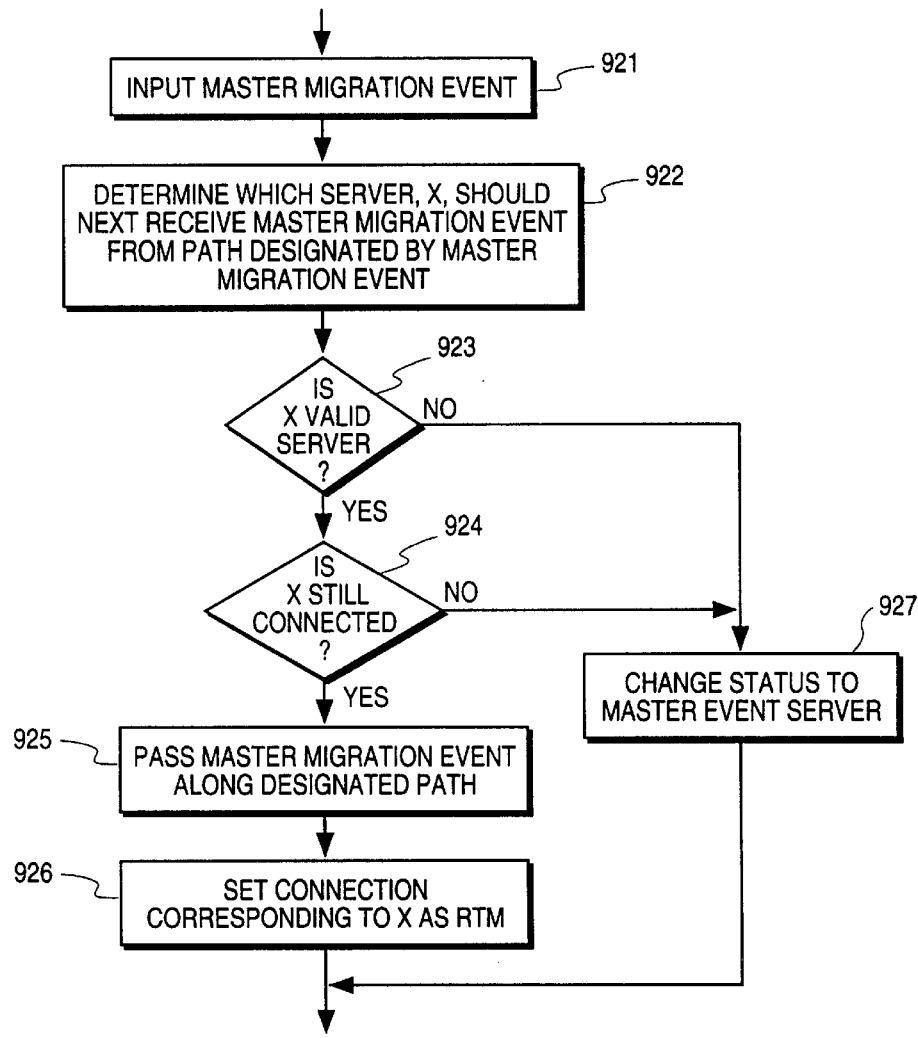
FIG. 9B is a flow diagram illustrating a technique used by a slave event server for handling a master migration event.

FIG. 9B illustrates the migration routine used by a slave event server according to one embodiment. Initially, a local slave event server inputs a master migration event that was sent in reply to a slave migration event sent by one of the slave event servers (step 921). Next, the local slave event server determines which event server, X, should next receive the master migration event (step 922). This determination is made on the basis of the path designated by the master migration event. Next, the local slave event server determines whether X is a valid server (step 923). If not, the local slave event server changes its own status to master event server, despite the fact that it was not the slave server which had requested to become the master (step 927). If X is a valid event server, then the local slave event server determines if X is still connected (step 924). If not, the local slave event server changes its own status to master event server (step 927). Therefore, if a given slave event server requests to become the master event server and subsequently becomes disconnected from the network before the master migration event is received, the master event server will be migrated by default to the last slave event server along the path toward the disconnected slave event server. Note that there is no master event server until the master migration event reaches its destination. Hence, this step (927) ensures that some event server will always assume the status of master event server if a connection is lost.

Assuming X is a valid event server and is still connected, the receiving slave event server passes the master migration event to the next slave event server along the designated path (step 925). Accordingly, the connection through which the master migration event is passed is designated as the RTM by the local slave event server.

Figure 9C:
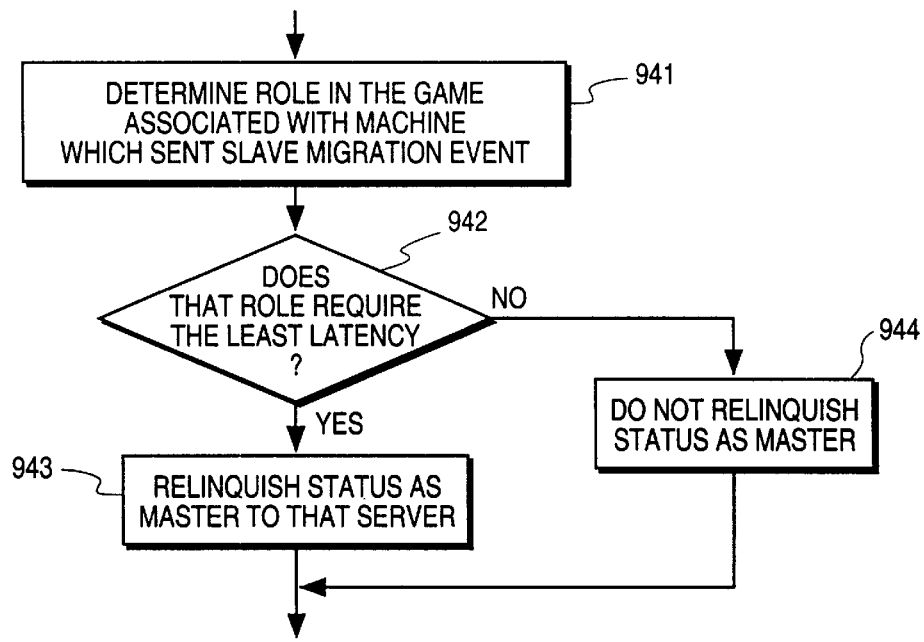
FIG. 9C is a flow diagram illustrating a technique for determining whether the master event server should be migrated to another computer.

FIG. 9C illustrates a routine by which a master event server can determine whether to relinquish its status as master event server. Upon receiving a slave migration event, the master event server identifies the role in the game that is associated with the slave event server that sent the slave migration event (step 941). If that role requires the lowest latency of any role in the game, then it is appropriate to migrate the master event server. Accordingly, the master event server relinquishes its status as master event server (step 943). Otherwise, the master event server retains its status as master (step 944).

Figure 6:
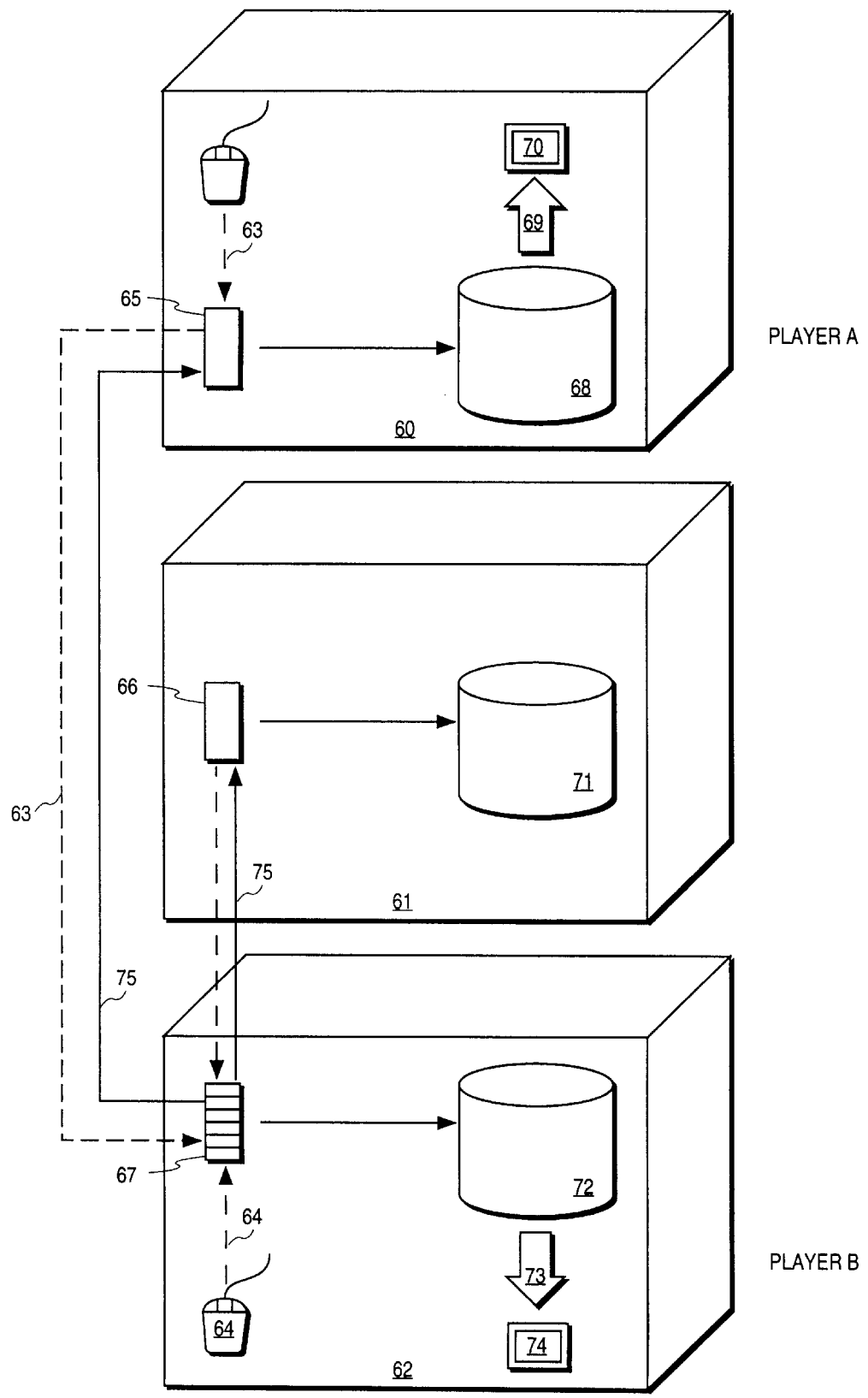
FIG. 6 illustrates a multi-player game running in a network in which a slave event server has established a direct connection to the master event server.

Referring again to FIG. 5B, once the master event server has been migrated to computer system 62, it may not be desirable from a latency standpoint (or for other reasons) to require events originating from computer system 60 to pass through the central server computer system 61. For example, once the master event server has been migrated to a different machine, it may be appropriate for one slave event server to reconnect to another slave event server to reduce its latency. Referring to both FIG. 5B and FIG. 6, note that slave event server 65 on computer 60 was initially connected to event server 66 on computer 61 (FIG. 5B). Event server 66 was initially the master event server. However, once event server 67 in computer 62 becomes the master event server, it becomes more efficient for slave event server 65 to connect directly to event server 67 (FIG. 6). Consequently, the present invention allows any given slave event server in the game to alter its connections in order to improve network latency. For example, slave event server 65 can establish a new connection directly to the newly designated master event server 67 and drop its existing connection to the former master event server 66, as illustrated in FIG. 6.

Figure 10:
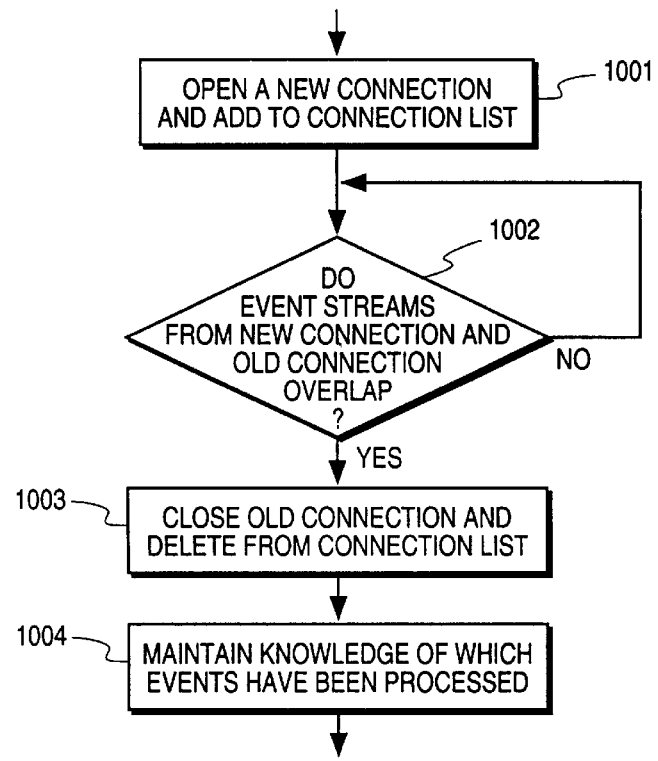
FIG. 10 is a flow diagram illustrating a technique used by a slave event server for changing a connection from a previous master event server to a current master event server.

FIG. 10 illustrates a routine for performing such reconnection. In one embodiment, the reconnection routine is initiated in response to a message from the former master event server, indicating that the receiving event server should reconnect to the new master event server. In FIG. 10, upon receiving the signal to reconnect, a slave event server opens a new connection to the newly-designated master event server (or to another slave event server, if appropriate), and adds that connection to the connection list (step 1001). Next, the slave event server waits until the event streams from the new connection and the old connection overlap (step 1002). In other words, the slave event server waits until it sees a sequence of events that is the same in the streams coming from both the old connection and the new connection. When the streams overlap, the event server closes the old connection and deletes the old connection from its connection list (step 1003). In addition, the slave event server maintains knowledge of which events have been processed in order to avoid duplication of events (step 1004).

Thus, a technique for reducing latency when synchronizing access to a multi-user database over a network has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of reducing latency in accessing in a master database stored in a node of a network having a plurality of nodes including a first node and a second node, the first node including a first event server and the second node including a second event server, the first event server and the second event server each having a status as a master event server or a slave event server with respect to network events, the event server having the status of master event server sequencing node commands to the master database, wherein at any given time only one node in the network can have the status of master event server and each node in the network processes events received from the master event server differently than events received from slave event servers, the method comprising the steps of:

(a) changing the status of the first event server from master event server to slave event server based on a network latency criterion; and (b) assigning the status of master event server to the second event server based on the network latency criterion.

2. The method of claim 1, wherein the step of changing the status of the first event server from master event server to slave event server based on a network latency criterion comprises the step of changing the status of the first event server from master event server to slave event server if the second node has a more restrictive network latency requirement than the first node.

3. A method of reducing latency in accessing in a master database stored in a node of a network having a plurality of nodes, the plurality of nodes including a local node and a plurality of remote nodes, a first one of the remote nodes having a master database and a master event server for sequencing commands to the master database, each network node having a status as a master event server or a slave event server with respect to network events, wherein at any given time only one node in the network can have the status of master event server and only one database in the network can have the status of master database, and wherein each node in the network processes events received from the master event server differently than events received from slave event servers, the method comprising the steps of:

(a) migrating the master database from the first remote node to the local node;

(b) migrating the master event server from the first remote node to the local node; and (c) inputting slave events from one or more remote nodes to the migrated master event server for execution by the local node against the migrated master database.

4. The method of claim 3, wherein the local node has a slave event server, and wherein the step of migrating the master event server comprises the steps of:

(a) changing the status of the master event server to slave event server; and (b) changing the status of the slave event server to master event server.

5. The method of claim 4, wherein the second one of the remote nodes includes a second slave event server, the method further comprising the steps of:

(a) disconnecting the second slave event server from the first slave event server; and (b) connecting the second slave event server directly to the master event server migrated to the local node.

6. The method of claim 4, wherein the second one of the remote nodes includes a second slave event server, the method further comprising the steps of:

(a) disconnecting the second slave event server from the first one of the remote nodes; and (b) connecting the second slave event server directly to a third one of the remote nodes.

7. The method of claim 3, wherein the first one of the remote nodes includes a first slave event server, the method further comprising the steps of:

(a) inputting to the first one of the remote nodes a slave event received from a second one of the remote nodes;

(b) forwarding the slave event from the first one of the remote nodes to the master event server migrated to the local node for execution by the local node against the master database;

(c) inputting to the first slave event server an event received from the master event server; and (d) forwarding the event received from the master event server migrated to the local node from the first one of the remote nodes to the second one of the remote nodes.

8. The method of claim 3, wherein the step of migrating the master event server comprises the step of migrating the master event server to the local node based on a network latency criterion.

9. The method of claim 8, wherein the step of migrating the master database comprises the step of migrating the master database to the local node based on a network latency criterion.

10. The method of claim 3, further comprising the step of selecting the local node as the node to which the master event server is to be migrated based on a network latency criterion.

11. The method of claim 3, wherein the local node is the node in the network having the most restrictive network latency requirement of the nodes in the network.

12. A method of implementing a machine executable game for a plurality of players, the game being playable over a network including a first node in communication with a plurality of other nodes, the game being generated based on a master database and a master event server, the master event server receiving a plurality of slave events and sequencing the received slave events for updating the master database, each network node having a status as a master event server or a slave event server with respect to network events, wherein at any given time only one node in the network can have the status of master event server and each node in the network processes events received from the master event server differently than events received from slave event servers, the master event server and the master database being initially stored in the first node, each player using one of said other nodes to perform one of a plurality of roles in the game, the method comprising the steps of:

(a) determining one of said other nodes to which the master event server will be migrated based on a network latency criterion associated with at least one of the roles; and (b) migrating the master event server to said one of said other nodes.

13. The method of claim 12, wherein the migrating step comprises the step of changing the status of the master event server to that of slave event server.

14. The method of claim 13, wherein said one of said other nodes to which the master event server is migrated has a slave event server, and wherein the migrating step further comprises the step of changing the status of the slave event server to that of master event server.

15. The method of claim 12, wherein a first one of said other nodes includes a first slave event server, and wherein a second one of said other nodes includes a second slave event server, the method further comprising the steps of:

(a) inputting to the first one of said other nodes a slave event received from the second one of said other nodes;

(b) forwarding the slave event from the first one of said other nodes to the migrated master event server migrated to said one of said other nodes;

(c) inputting to the first slave event server a master event received from the master event server migrated to said one of said other nodes; and (d) forwarding the master event received from the master event server migrated to said one of said other nodes to the second slave event server.

16. The method of claim 15, wherein the network includes a communication link between the first slave event server and the second slave event server, the method further comprising the steps of:

(a) disconnecting the communication link between the first slave event server and the second slave event server; and (b) establishing a communication link between the second slave event server and the migrated master event server, such that requests initiated from the second one of said other nodes are transmitted to the master event server migrated to said one of said other nodes without passing through the first one of said other nodes.

17. The method of claim 15, wherein a third one of said other nodes includes a third slave event server, wherein the network includes a communication link between the first slave event server and the second slave event server, and wherein the method further comprises the steps of:

(a) disconnecting the communication link between the first slave event server and the second slave event server; and (b) establishing a communication link between the second slave event server and the third event server, such that requests initiated from the second one of said other nodes are transmitted to the third event server without passing through the first one of said other nodes.

18. The method of claim 17, wherein the first of the other nodes is used by the player having the role requiring the lowest level of latency, the method further comprising the step of using the third node to forward a slave event received from the first of the other nodes to the second of the other nodes.

19. The method of claim 12, wherein the network is a wide-area network.

20. The method of claim 12, wherein the step of determining comprises the step of determining said one of said other nodes to which the master event server should be migrated based on the role of the player using said one of said other nodes.

21. The method of claim 12, further comprising the step of migrating at least a portion of the master database based on the network latency criterion.

22. The method of claim 12, further comprising the step of migrating a copy of at least a portion of the master database to each of said other nodes.

23. The method of claim 12, wherein the network latency criterion is a target latency for a given one of the roles.

24. The method of claim 12, wherein the network latency criterion is a maximum allowable latency for a given one of the roles.

25. A method of reducing latency in a network during execution of computer program code embodying a multiple-player game, the network having a first node and a second node coupled to a third node, a first player of the multi-player game participating in the game using the first node and a second player of the multi-player game participating in the game using the second node, the game being characterized by a master event server receiving and storing user inputs and a database representing a game environment in response to the user inputs, each network node having a status as a master event server or a slave event server with respect to network events, wherein at any given time only one node in the network can have the status of master event server and each node in the network processes events received from the master event server differently than events received from slave event servers, the master event server and the database being initially stored on the third node, the method comprising the steps of:

(a) determining which of the players has a role in the game requiring a lowest level of latency;

(b) identifying which one of the first node and the second node is used by the player having the role requiring the lowest level of latency; and (c) migrating the master event server to said one of the first node and the second node that is used by the player having the role requiring the lowest level of latency.

26. The method of claim 25, wherein the migrating step comprises the step of changing the status of the master event server to that of slave event server.

27. The method of claim 25, wherein said one of the first node and the second node that is used by the player having the role requiring the lowest level of latency has a slave event server, and wherein the migrating step further comprises the step of changing the status of the slave event server to that of master event server.

28. The method of claim 25, further comprising the step of using the third node to forward a slave event to said one of the first node and the second node that is used by the player having the role requiring the lowest level of latency.

29. The method of claim 25, further comprising the step of migrating the database to said one of the first node and the second node that is used by the player having the role requiring the lowest level of latency.

30. The method of claim 25, further comprising the step of placing a copy of the database in each of the first node and the second node, such that each said copy is updated from the contents of the master event server migrated to said one of the first node and the second node that is used by the player having the role requiring the lowest level of latency.

31. An apparatus for reducing latency in a network having a plurality of processing systems, the apparatus comprising:

(a) a first processing system generating a first portion of a multi-player game, the first processing system having stored therein an event server, the event server receiving and storing user inputs for controlling the game, the first processing system further having stored therein a database representing a game environment responsive to the user inputs;

(b) a second processing system coupled to the first processing system, the second processing system generating a second portion of the multi-player game operable by a first player of the multi-player game, the first player performing a first role in the multi-player game, the first role having a first latency requirement;

(c) a third processing system coupled to the first processing system, the third processing system generating a third portion of the multi-player game operable by a second player of the multi-player game, the second player performing a second role in the multi-player game, the second role having a second latency requirement; and (d) the first processing system evaluating the first latency requirement and the second latency requirement and, in response, migrating the event server to either the second memory or the third memory according to a relationship between the first latency requirement and the second latency requirement.

32. The apparatus of claim 31, wherein the database is migrated to either the second memory or the third memory according to the relationship between the first latency requirement and the second latency requirement.

33. The apparatus of claim 31, further comprising means for migrating a copy of the database to both the first processing system and the second processing system.

34. The apparatus of claim 31, wherein the latency requirement is a target latency for a given one of the roles.

35. The apparatus of claim 31, wherein the latency requirement is a maximum allowable latency for a given one of the roles.

36. The apparatus of claim 31, wherein the first processing system forwards a slave event received from whichever of the second processing system and the third processing system does not have the master event server to whichever of the second processing system and the third processing system has the master event server.

37. The apparatus of claim 31, wherein the first processing system is further configured:

(a) to determine when the master event server has been migrated to the third processing system, and (b) to transmit the slave event directly to the master event server in the third processing system, such that the slave event does not pass through the second processing system.

38. An apparatus for reducing latency in accessing a database in a network having a plurality of nodes, the plurality of nodes including a local node and a plurality of remote nodes, at least one of the remote nodes including the database and a master event server for sequencing commands for the database, each network node having a status as a master event server or a slave event server with respect to network events, wherein at any given time only one node in the network can have the status of master event server and each node in the network processes events received from the master event server differently than events received from slave event servers, the apparatus comprising:

(a) means for migrating a master copy of the database to the local node;

(b) means for migrating the master event server to the local node; and (c) means for forwarding slave events from the remote nodes to the migrated master event server for sequencing the forwarded slave events for execution by the local node against the copy of the database migrated to the local node.

39. The apparatus of claim 38, wherein the local node has a slave event server, and wherein the means for migrating the master event server comprises:

(a) means for changing the status of the master event server to that of slave event server; and (b) means for changing the status of the slave event server to that of master event server.

40. The apparatus of claim 38, wherein a first one of the remote nodes includes a first slave event server, the apparatus further comprising:

(a) means for inputting to the first one of the remote nodes a slave event received from a second one of the remote nodes;

(b) means for forwarding the slave event from the first one of the remote nodes to the master event server migrated to the local node for execution by the local node against the master database;

(c) means for inputting to the first slave event server a master event received from the master event server; and (d) means for forwarding the master event received from the master event server migrated to the local node to the second one of the remote nodes.

41. The apparatus of claim 39, wherein the second one of the remote nodes includes a second slave event server, the method further comprising the steps of:

(a) means for disconnecting the second slave event server from the first slave event server; and (b) means for connecting the second slave event server directly to the master event server migrated to the local node.

42. The apparatus of claim 39, wherein the second one of the remote nodes includes a second slave event server, the method further comprising the steps of:

(a) means for disconnecting the second slave event server from the first slave event server; and (b) means for connecting the second slave event server directly to a third one of the remote nodes, such that slave events transmitted by the second event server and destined for the master event server do not pass through the first one of the remote nodes.

43. The apparatus of claim 38, wherein the means for migrating the event server comprises means for migrating the master event server to the local node based on a network latency criterion.

44. The apparatus of claim 43, wherein the network latency requirement is a target latency value.

45. The apparatus of claim 43, wherein the network latency requirement is a maximum allowable latency for the local node.

46. The apparatus of claim 43, wherein the means for migrating the master copy of the database comprises means for migrating the master copy of the database to the local node based on a network latency criterion.

47. The apparatus of claim 38, further comprising means for selecting the local node as the node to which the master event server is to be migrated based on a network latency criterion.

48. The apparatus of claim 38, wherein the local node is the node in the network having the most restrictive network latency requirement of the nodes the network.

49. The apparatus of claim 38, further comprising:

(a) means for evaluating a bandwidth criterion associated with at least one of the nodes in the network;

(b) wherein the means for migrating a master copy of the database includes means for migrating the master copy of the database to the local node based on an output of the means for evaluating.

50. A machine-readable program storage medium tangibly embodying a program of instructions, the instructions executable by a server computer to perform method steps for implementing a game using a computer network, the computer network including the server computer and a plurality of client computers, the game having a plurality of players, each player having a different role in the game by using a different one of said client computers, the game characterized by a master event server storing user inputs for updating a master database, each network node having a status as a master event server or a slave event server with respect to network events, wherein at any given time only one node in the network can have the status of master event server and each node in the network processes events received from the master event server differently than events received from slave event servers, the method steps comprising the steps of:

(a) providing a latency criterion for at least one of the roles in the game;

(b) determining, for at least one of the roles having a latency criterion, which of the client computers in the network is associated with said role;

(c) identifying a first one of the client computers that is used by a player having the role with the most restrictive latency criterion of all the roles; and (d) migrating the master event server from the server computer to the first one of the client computers.

51. The program storage medium of claim 50 wherein the local node has a slave event server, and wherein the migrating step comprises the steps of:

(a) changing the status of the master event server to that of slave event server; and (b) changing the status of the slave event server to that of master event server.

52. The program storage medium of claim 50, wherein the method steps further comprise the step of using the server computer to forward a slave event received from a second one of the client computers to the master event server migrated to the first one of the client computers.

53. The program storage medium of claim 50, wherein the method steps further comprise the step of using the server computer to forward a master event received from the master event server migrated to the first one of the client computers to a second one of the client computers.

54. The program storage medium of claim 52, wherein the method steps further comprise the steps of:

(a) providing an indication to the second one of the client computers that the master event server has been migrated to said particular one of the client computers; and (b) providing a direct link between the second one of the client computers and the master event server, such that slave events initiated by the second client computer do not pass through the server computer.

55. The program storage medium of claim 50, wherein the method steps further comprise the step of migrating a copy of at least a portion of the master database to at least one of the client computers to which the master event server has not been migrated.

56. A method of communicating events in a network including a plurality of nodes, each network node having a status as a master event server or a slave event server with respect to network events, wherein at any given time only one node in the network can have the status of master event server and each node in the network processes events received from the master event server differently than events received from slave event servers, one of the plurality of nodes having a master database and the master event server stored therein, the master event server sequencing slave commands to the master database, the method comprising the steps of:

(a) inputting to a first one of the nodes a slave event received from a second one of the remote nodes;

(b) determining whether the master event server resides within the first one of the nodes;

(c) if the master event server does not reside within the first one of the nodes, identifying a third one of the plurality of nodes in which the master event server resides and forwarding the slave event to the master event server in the third one of the nodes.

57. The method of claim 56, further comprising the step of establishing a communication link between the second one of the nodes and the third one of the nodes, such that a second slave event initiated by the second one of the nodes is transferred to the third one of the nodes without passing through any other nodes of the plurality of nodes.

58. The method of claim 56, wherein the master event server has been migrated from the first one of the nodes to the third one of the nodes prior to the inputting step.

59. The method of claim 56, wherein the first one of the nodes includes a first event server, wherein the first event server can have a first status in which the first event server is the master event server, or a second status in which the first event server is a slave event server, the method further comprising the step of switching the status of the first event server from the first status to the second status prior to the inputting step.

* * * * *